United States Patent [19]

Farrow

[11] Patent Number: 4,779,435
[45] Date of Patent: * Oct. 25, 1988

[54] ANTI-THEFT DEVICE FOR ROAD VEHICLES

[76] Inventor: Robert T. Farrow, 3638 Yorkingham Dr., Houston, Tex. 77066

[*] Notice: The portion of the term of this patent subsequent to Sep. 22, 2004 has been disclaimed.

[21] Appl. No.: 101,582

[22] Filed: Sep. 28, 1987

Related U.S. Application Data

[63] Continuation of Ser. No. 772,609, Sep. 4, 1985, Pat. No. 4,696,172.

[51] Int. Cl.⁴ ............................................. E05B 65/12
[52] U.S. Cl. ...................................... 70/238; 70/199; 70/200; 70/202
[58] Field of Search ................. 70/238, 237, 201, 203, 70/198, 200, 212

[56] References Cited

U.S. PATENT DOCUMENTS

| | | | |
|---|---|---|---|
| 1,558,628 | 10/1925 | Purcell | 70/203 X |
| 2,716,336 | 8/1955 | Ross | 70/238 |
| 3,190,090 | 6/1965 | Zaidener | 70/238 X |
| 3,245,239 | 4/1966 | Zaidener | 70/238 X |
| 3,435,646 | 4/1969 | Michnoff | 70/203 |
| 3,550,409 | 12/1970 | Pariser | 70/238 X |
| 3,690,131 | 9/1972 | Davis | 70/238 X |
| 4,333,326 | 6/1982 | Winters | 70/237 X |
| 4,696,172 | 9/1987 | Farrow | 70/238 |

Primary Examiner—Robert L. Wolfe
Assistant Examiner—Suzanne L. Dino
Attorney, Agent, or Firm—Neal J. Mosely

[57] ABSTRACT

An anti-theft device for road vehicles comprises a yoke having a solid extension or block for positioning below the brake pedal with the brake arm extending through the yoke. An elongated rod member is connected to the yoke and has an inverted generally U-shaped upper end for hooking over a spoke of the vehicle steering wheel and an externally threaded lower end which receives an intermediate connector member having an outwardly extending tab. The intermediate connector member may be secured at selective distances relative to the upper end of the rod to fit various vehicles. The block or extension and the intermediate connector are pinned together with a lock pin and secured with a padlock. The anti-theft device in the locked position provides a mechanical interlock between the vehicle steering wheel and the vehicle foot brake pedal to prevent rotation of the steering wheel, and between the foot brake pedal and the floorboard of the vehicle to prevent the brake pedal from being depressed.

15 Claims, 1 Drawing Sheet

U.S. Patent  Oct. 25, 1988  4,779,435
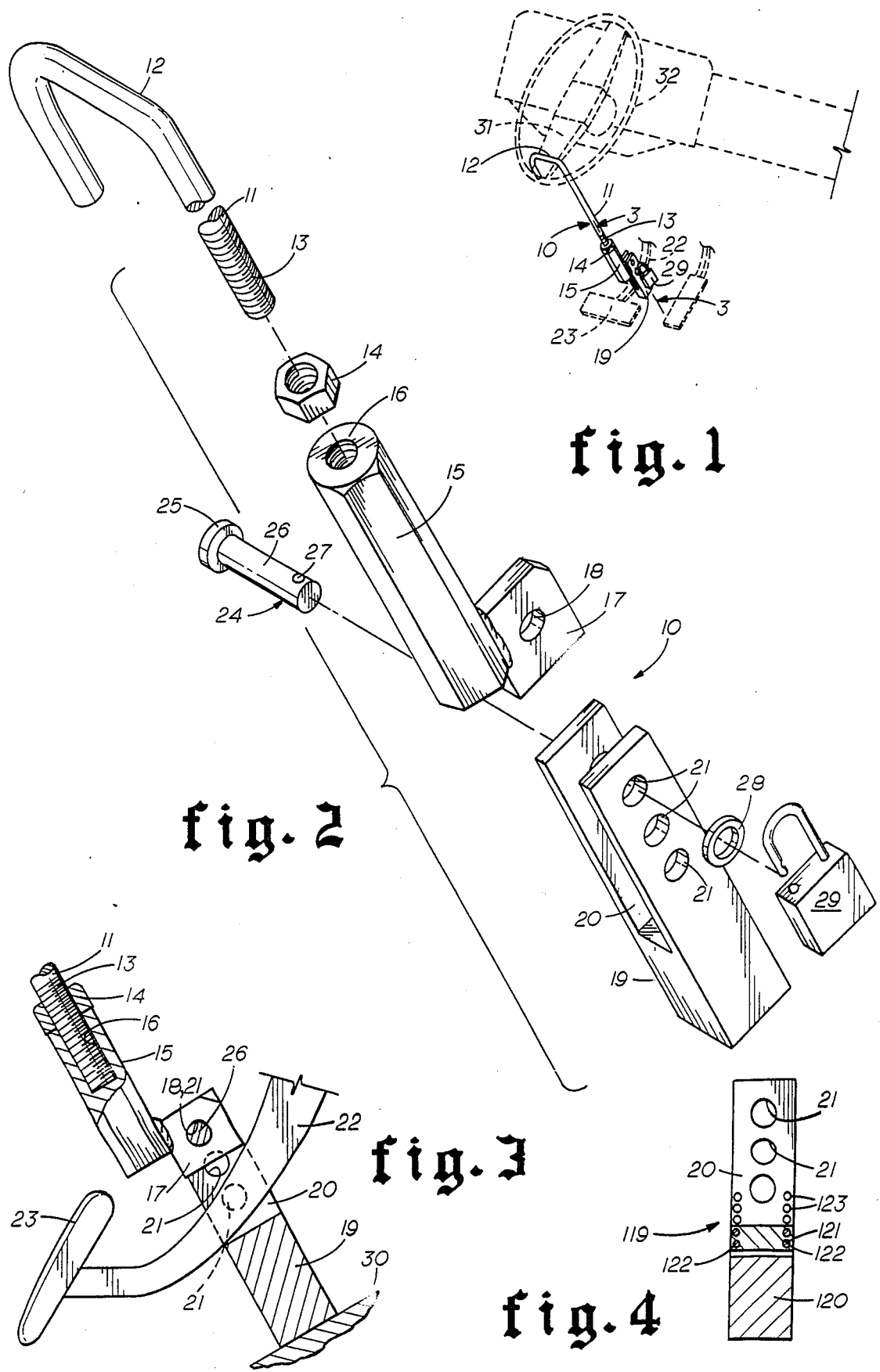

ANTI-THEFT DEVICE FOR ROAD VEHICLES

CROSS REFERENCE TO RELATED APPLICATION

This application is a continuation of copending application Ser. No. 772,609, filed Sept. 4, 1985, now U.S. Pat. No. 4,696,172, issued Sept. 29, 1987.

BACKGROUND OF THE INVENTION

Field of the Invention

This invention relates generally to anti-theft devices for vehicles, and more particularly to an anti-theft device which may be locked in a position to provide a mechanical interlock between the vehicle steering wheel and the foot brake pedal to prevent rotation of the steering wheel, and between the foot brake pedal and the floorboard of the vehicle to prevent the brake pedal from being depressed.

Brief Description of the Prior Art

Anti-theft devices which provide a mechanical interlock between a vehicle steering wheel and the vehicle foot brake pedal are known in the art. There are several patents which disclose anti-theft devices of various construction which may be locked into position between the steering wheel and the brake pedal, none of which provide a mechanical interlock between the vehicle steering wheel, foot brake pedal, and the floorboard of the vehicle wherein a locking mechanism fits between the brake pedal and the vehicle floorboard and prevents the brake pedal from being depressed.

Ross, U.S. Pat. No. 2,716,336, discloses a locking device which hooks over the brake pedal and has a lock which fastens around the steering wheel. The device requires adjustment to be fitted properly between the brake pedal and the steering wheel.

Zaidener, U.S. Pat. No. 3,190,090, discloses another locking device which fits over the steering wheel and hooks to the brake pedal.

Pariser, U.S. Pat. No. 3,550,409 discloses still another locking device which hooks beneath the brake pedal and over the steering wheel and has a lock which locates the hook in relation to the brake pedal.

Davis, U.S. Pat. No. 3,690,131, discloses still another locking mechanism which hooks around the brake pedal and over the steering wheel and has provisions for a locking mechanism to hold it in place.

Zaidener, U.S. Pat. No. 3,245,239, discloses still another locking mechanism which hooks under the brake pedal and over the steering wheel.

The prior art in general, and these patents in particular do not disclose, individually or in combination, the present anti-theft device for road vehicles which comprises a yoke having a solid extension or block for positioning below the brake pedal with the brake arm extending through the yoke. An elongated rod member is connected to the yoke and has an inverted generally Ushaped upper end for hooking over a spoke of the vehicle steering wheel and an externally threaded lower end which receives an intermediate connector member having an outwardly extending tab. The intermediate connector member may be secured at selective distances relative to the upper end of the rod to fit various vehicles. The block or extension and the intermediate connector are pinned together with a lock pin and secured with a padlock. The antitheft device in the locked position provides a mechanical interlock between the vehicle steering wheel and the vehicle foot brake pedal to prevent rotation of the steering wheel, and between the foot brake pedal and the floorboard of the vehicle to prevent the brake pedal from being depressed.

SUMMARY OF THE INVENTION

It is therefore an object of the present invention to provide an anti-theft device for vehicles which provides a mechanical interlock between the vehicle steering wheel, foot brake pedal, and the floorboard of the vehicle wherein a locking mechanism fits between the brake pedal and the floorboard and prevents the brake pedal from being depressed.

It is another object of this invention to provide an antitheft device for vehicles which when locked in position prevents rotation of the vehicle steering wheel.

Another object of this invention is to provide an antitheft device for vehicles which when locked in position will render the vehicle brake pedal inoperative.

Another object of this invention is to provide an antitheft device for vehicles which is adjustable to fit various models of vehicles.

A further object of this invention is to provide a an anti-theft device for vehicles which is simple in construction, economical to manufacture, and rugged and durable in use.

Other objects of the invention will become apparent from time to time throughout the specification and claims as hereinafter related.

The above noted objects and other objects of the invent ion are accomplished by an anti-theft device for road vehicles comprising a yoke having an extension or block providing a pedal stop for positioning below the brake pedal with the brake arm extending through the yoke. An elongated rod member is connected to the yoke and has an inverted generally U-shaped upper end for hooking over a spoke of the vehicle steering wheel and an externally threaded lower end which receives an intermediate connector member having an outwardly extending tab. The intermediate connector member may be secured at selective distances relative to the upper end of the rod to fit various vehicles. The block or extension and the intermediate connector are pinned together with a lock pin and secured with a padlock. The anti-theft device in the locked position provides a mechanical interlock between the vehicle steering wheel and the vehicle foot brake pedal to prevent rotation of the steering wheel, and between the foot brake pedal and the floorboard for the vehicle to prevent the brake pedal from being depressed.

BRIEF DESCRIPTION OF THE DRAWINGS

FIG. 1 is a perspective view of the anti-theft device engaging and locking the steering wheel and brake pedal of an automobile together.

FIG. 2 is an isometric view of the anti-theft device showing the elements of the device in exploded relation.

FIG. 3 is a longitudinal cross section taken along line 3—3 of FIG. 1 showing the details of the control pedal block member with the vehicle brake pedal locked therein.

FIG. 4 is a plan view of a modified control pedal block member having an adjustable pedal stop.

DESCRIPTION OF THE PREFERRED EMBODIMENT

Referring to the drawings by numerals of reference, there is shown an anti-theft device 10 illustrating a preferred embodiment of this invention. The anti-theft device 10 comprises an elongated rod member 11 having an inverted generally U-shaped upper end 12 and an externally threaded lower end 13. The rod member 11 is preferably of a torch-resistant and rust-resistant steel alloy. A lock nut 14 is installed on the threaded lower end 13 of the elongated rod 11. An intermediate connector member 15, or microadjusting locking plate, of hex bar stock having internal threads 16 is threadedly received on the threaded lower end 13 of the elongated rod 11. Threads 13 and 16 cooperate as a coupling nut for the device, and lock nut 14 locks the connected parts in an accurately set position. A flat tab 17 projects outwardly from one side of the connector member 15 at the bottom thereof. The tab 17 may be secured to the connector member by suitable means such as welding, and has a transversely extending hole 18.

A yoke member for blocking movement of the vehicle brake pedal comprises a lower rectangular extension or block member 19 having a vertical slot 20 extending downwardly a distance from the top surface to provide the parallel side arms of the yoke. A series of vertically spaced holes 21 transverse to the slot 20 extend through opposing side walls of the rectangular member 19. The width of the slot 20 provides a yoke sized to receive the operating arm 22 of a conventional foot brake 23, and the depth of the slot is greater than the combined height of the operating arm 22 and the tab 17.

An alignment pin or lock pin 24 has a head 25 larger than the holes 21 and a shank 26 smaller in diameter than the holes 21. A hole 27 extends transversely through the shank 26 near the outer end. A washer 28 is received on the end of the shank 26, and a suitable lock such as a combination lock or pad lock 29 is received within the hole 27 of the shank 26. If desired, the holes 18 and 21 may be sized to receive the hasp of a padlock 29 directly, thus eliminating the need for the alignment pin 24.

In FIG. 4, a modified control pedal block is shown. Control pedal block member or yoke 119 has a slot 20 and connection holes 21 as in the embodiment of FIGS. 1-3. The bottom portion, however has a fixed block portion 120 and an adjustable pedal stop 121. The side walls of yoke 119 and the adjustable pedal block 121 have matching holes 123 in which there are positioned retaining pins 122. The pins 122 may be solid pins or two part pins which fit together from opposite sides of the yoke.

OPERATION

To install the anti-theft device, lock nut 14 is installed on the lower threaded end 13 of the elongated rod 11 and intermediate connector member or microadjusting locking plate 15 is then installed on the lower threaded end of the rod 11.

The vehicle yoke member 19 is placed on the floorboard 30 of the vehicle with the lever arm 22 of the foot brake 23 positioned within the slot 20 of the yoke. The U-shaped upper end 12 of the rod 11 is placed over a spoke 31 of the vehicle steering wheel 32. The intermediate connector member or microadjusting locking plate 15 is rotated on the threads 13 of the rod 11 to adjust the length so that the tab 17 is received on top of the brake operating arm 22 within the slot 20 with the hole 18 aligned with one set of the vertically spaced holes 21. The intermediate connector member or microadjusting locking plate 15 may be swung in and out of engagement with the slot 20 until the holes are properly aligned, and the lock nut 14 is run down on the threads 13 and tightened against the top surface of member 15.

It should be noted that the threaded lower end 13 of the rod 11 and the series of vertically spaced holes 21 of the control pedal block member allow a wide range of adjustability so that the device 10 can easily be adapted to fit various models of vehicles. The rod 11 and yoke 19 may be adjusted through 360° of rotation in assembly to permit the device to be used in a variety of positions. Once the device is adjusted, it is not necessary to repeat the above adjusting steps unless the device is to be used on another vehicle. The lock nut 14 secures the connection in place for subsequent use.

After the holes are properly aligned, the lock pin or alignment pin 24 is inserted through the holes 18 and 21 to connect the intermediate connector member 15 to the lower control pedal block member 19. The washer 28 is installed on the shaft 26 assembled device in the locked position.

In this manner, a mechanical interlock is provided between the vehicle steering wheel and the foot brake pedal to prevent rotation of the steering wheel, and between the brake pedal and the floorboard of the vehicle. The lower extension or block member of yoke 19 between the brake pedal and the floorboard prevents the brake pedal from being depressed. The steering wheel may be turned prior to installation of the device such that the wheels are diverted from a straight position so that the vehicle may not be towed away.

While this invention has been described fully and completely with special emphasis upon a preferred embodiment, it should be understood that within the scope of the appended claims the invention may be practiced otherwise than as specifically described herein.

What is claimed is:

1. An anti-theft device for a road vehicle comprising;
   a yoke having an extension adapted to be removably positioned between the vehicle brake pedal and vehicle floorboard with the pedal fitted in said yoke,
   said yoke extension being of a size preventing said pedal from being depressed,
   an elongated rod member having an upper hooked end adapted to releasably engage a portion of the vehicle steering wheel and a lower end provided with means for adjustable connection to said yoke, and
   removable locking means cooperable with said adjustable connection means for locking said rod member to said yoke in a selected position,
   said device in the locked position providing a mechanical interlock between the vehicle steering wheel and pedal to prevent rotation of the steering wheel, and between the vehicle pedal and floorboard and said yoke preventing the pedal from being depressed.

2. An anti-theft device according to claim 1 including an intermediate connector member adapted to be received on said adjustable connection means at the lower end of said rod and movable thereon for placement at selective distances relative to the upper end of said rod member and having means thereon for releasably connecting said intermediate connector member to said yoke, securing means carried on the lower end of said rod member for adjustably securing said intermediate connector member on said rod at a selective distance from the upper end of said rod member, said yoke having means for receiving a portion of said pedal and the releasable connection means of said intermediate connector member, and said removable locking means locking said intermediate connector member to said yoke to secure said pedal within said block member.

3. An anti-theft device according to claim 2 in which said elongated rod member upper end is formed into an inverted generally U-shaped configuration.

4. An anti-theft device according to claim 3 in which said adjustable connection means of said elongated rod member lower end comprises external threads on said rod member and internal threads on said intermediate connector member.

5. An anti-theft device according to claim 4 in which said intermediate connector member comprises:

a rod member having said internal threads threadedly received on said threaded lower end of the elongated rod, said releasably connecting means of said intermediate connector comprises a flat tab projecting outwardly from one side of said rod member at the bottom thereof having at least one hole extending transversely therethrough, and said securing means further comprises a lock nut threadedly received on the threaded lower end of said elongated rod.

6. An anti-theft device according to claim 1 in which said intermediate connector member comprises;

a rod member, and said releasably connecting means of said intermediate connector comprises;

a flat tab projecting outwardly from one side of said rod member at the bottom thereof having at least one hole extending transversely therethrough.

7. An anti-theft device according to claim 6 in which said yoke member comprises;

a rectangular member having a vertical slot extending downwardly a distance from the top surface and a series of vertically spaced holes transverse to the slot extending through opposing side walls thereof, and said slot being adapted to receive a portion of the pedal and the flat tab of said intermediate connector member.

8. An anti-theft device according to claim 7 in which said slot is of sufficient width to receive the operating arm of a conventional vehicle foot brake, and of greater depth than the combined height of the control arm and said tab.

9. An anti-theft device according to claim 8 in which said removable locking means comprises;

a lock pin having a head larger than said holes in said side walls and said tab, a shank smaller in diameter than said holes, and a hole extending transversely through the shank near the outer end, said transverse hole being adapted to receive conventional lock members, and a washer received on the end of the shank between said block side wall and said transverse hole.

10. An anti-theft device according to claim 5 in which said pedal block member comprises;

a rectangular member having a vertical slot extending downwardly a distance from the top surface and a series of vertically spaced holes transverse to the slot extending through opposing side walls of the rectangular member, and said slot being adapted to receive a portion of the pedal and the flat tab of said intermediate connector member.

11. An anti-theft device according to claim 10 in which said slot is of sufficient width to receive the brake pedal, and of greater depth than the combined height of the pedal and the tab.

12. An anti-theft device according to claim 10 in which said removable locking means comprises;

a lock pin having a head larger than said holes in said side walls and said tab, a shank smaller in diameter than same said holes, and a hole extending transversely through the shank near the outer end, said transverse hole being adapted to receive conventional lock members, and a washer received on the end of the shank between said block side wall and said transverse hole.

13. An anti-theft device according to claim 1 in which said yoke member comprises;

a rectangular member having a vertical slot extending downwardly a distance from the top surface and a series of vertically spaced holes transverse to the slot extending through opposing side walls of the rectangular member, and said slot being adapted to receive a portion of the pedal and the releasable connection means of said intermediate connector member.

14. An anti-theft device according to claim 13 in which said slot is of sufficient width to receive the brake pedal, and of greater depth than the combined height of the pedal and the releasable connection means.

15. An anti-theft device for a road vehicle comprising;

a yoke having an extension adapted to be removably positioned between a vehicle brake pedal and the vehicle floorboard with the pedal fitted in said yoke, said yoke extension being of a size preventing said pedal from being depressed, an elongated rod member having an upper hooked end adapted to releasably engage a portion of the vehicle steering wheel and a lower end provided with means for adjustable connection to said yoke, means on the lower end of said rod member for adjustable connection of said rod to an intermediate connector member, an intermediate connector member adapted to be received on said adjustable connection means at the lower end of said rod and movable thereon for placement at selective distances relative to the upper end of said rod member and having means thereon for releasably connecting said intermediate connector member to said yoke, securing means carried on the lower end of said rod member for adjustably securing said intermediate connector member on said rod at a selective distance from the upper end of said rod member, removable locking means for locking said rod member to said yoke, said yoke having means for receiving a portion of said pedal and the releasable connection means of said intermediate connector member, and said removable locking means locking said intermediate connector member to said yoke to secure said pedal within said block member, said device in the locked position providing a mechanical interlock between the vehicle steering wheel and pedal to prevent rotation of the steering wheel, and between the pedal and floorboard of said vehicle and said yoke preventing the pedal from being depressed

* * * * *